United States Patent
Gallagher et al.

(10) Patent No.: US 12,200,004 B2
(45) Date of Patent: Jan. 14, 2025

(54) PRIVACY-ENHANCED COMMON VULNERABILITIES AND EXPOSURES (CVE) DETECTION

(71) Applicant: Red Hat, Inc., Raleigh, NC (US)

(72) Inventors: Brian Gallagher, Waterford (IE); Cathal O'Connor, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 290 days.

(21) Appl. No.: 17/660,502

(22) Filed: Apr. 25, 2022

(65) Prior Publication Data

US 2023/0344853 A1    Oct. 26, 2023

(51) Int. Cl.
    *H04L 29/00*   (2006.01)
    *H04L 9/00*    (2022.01)
    *H04L 9/40*    (2022.01)

(52) U.S. Cl.
    CPC .......... *H04L 63/1433* (2013.01); *H04L 9/008* (2013.01); *H04L 63/0428* (2013.01)

(58) Field of Classification Search
    CPC .. H04L 63/1433; H04L 9/008; H04L 63/0428
    See application file for complete search history.

(56) References Cited

U.S. PATENT DOCUMENTS

| | | | |
|---|---|---|---|
| 9,087,212 B2 | 7/2015 | Balakrishnan et al. | |
| 10,002,247 B2* | 6/2018 | Suarez | G06F 21/31 |
| 10,032,032 B2* | 7/2018 | Suarez | G06F 21/6218 |
| 10,261,782 B2* | 4/2019 | Suarez | G06F 8/63 |
| 10,601,593 B2* | 3/2020 | Antonopoulos | H04L 9/088 |
| 10,726,154 B2* | 7/2020 | Anderson | G06F 21/6254 |
| 10,984,130 B2* | 4/2021 | Nissim Kobliner | G06F 16/24532 |
| 10,999,312 B2 | 5/2021 | Viswambharan et al. | |
| 11,089,061 B1* | 8/2021 | Sinha | H04L 51/212 |
| 11,216,563 B1* | 1/2022 | Veselov | H04L 63/1408 |

(Continued)

FOREIGN PATENT DOCUMENTS

| | | | | |
|---|---|---|---|---|
| CN | 103473505 A | * | 12/2013 | |
| WO | WO-2019198003 A1 | * | 10/2019 | G06F 12/1408 |

OTHER PUBLICATIONS

"Malicious Code Detection for Trusted Execution Environment Based on Paillier Homomorphic Encryption", Wang et al., IEICE Trans. Commun., vol. E103-B, No. 3 Mar. 2020.

(Continued)

*Primary Examiner* — Don G Zhao
(74) *Attorney, Agent, or Firm* — Womble Bond Dickinson (US) LLP

(57) ABSTRACT

Disclosed are systems and methods for scanning a client codebase for vulnerabilities without exposing the client information. An example method includes receiving, from a client computing device, a scan request to scan a set of encrypted client information to identify vulnerabilities applicable to the client information. The method also includes responsive to the scan request, analyzing, by a processing device, the encrypted client information to generate scan results that identify vulnerabilities applicable to the client information, wherein the analyzing is performed without decrypting the client information. The method also includes returning the scan results to the client, wherein the scan results are in encrypted form when the scan results are generated.

14 Claims, 7 Drawing Sheets

(56) References Cited

U.S. PATENT DOCUMENTS

| | | | |
|---|---|---|---|
| 11,394,740 B1* | 7/2022 | Shake | G06N 20/00 |
| 11,764,941 B2* | 9/2023 | Sarpatwar | G06N 3/08 |
| 11,803,766 B1* | 10/2023 | Srinivasan | G06N 5/04 |
| 11,924,349 B2* | 3/2024 | Vemury | H04L 9/008 |
| 11,943,364 B2* | 3/2024 | Streit | G06F 21/6245 |
| 2017/0103217 A1* | 4/2017 | Arasu | H04L 9/0819 |
| 2017/0177877 A1* | 6/2017 | Suarez | G06F 21/6218 |
| 2017/0235969 A1* | 8/2017 | Kamara | G06F 16/284 |
| | | | 713/159 |
| 2020/0074084 A1 | 3/2020 | Dorrans et al. | |
| 2021/0112087 A1 | 4/2021 | Tassoumt et al. | |
| 2021/0152589 A1 | 5/2021 | Waplington et al. | |
| 2021/0173940 A1 | 6/2021 | Mylrea et al. | |
| 2021/0334365 A1* | 10/2021 | Vessels | G06F 21/51 |
| 2022/0166607 A1* | 5/2022 | Ratha | G06N 3/08 |
| 2022/0210141 A1* | 6/2022 | Parekh | H04L 63/08 |
| 2022/0278995 A1* | 9/2022 | Zhou | G06N 3/045 |
| 2022/0294818 A1* | 9/2022 | Parekh | G06F 21/602 |
| 2023/0403157 A1* | 12/2023 | Vemury | H04L 9/008 |

OTHER PUBLICATIONS

"CVE Number Authority (CNA) Information Sharing and Embargo Policy", webpage accessed at https://support.lenovo.com/in/en/product_security/ps500353-cve-number-authority-cna-information-sharing-and-embargo-policy.

* cited by examiner

500

Receive scan request from client computing device to scan a set of encrypted client information to identify vulnerabilities 502

Analyze encrypted client information to generate scan results that identify vulnerabilities without decrypting the client information 504

Send encrypted scan results to the client 506

Fig. 5

PRIVACY-ENHANCED COMMON VULNERABILITIES AND EXPOSURES (CVE) DETECTION

TECHNICAL FIELD

Aspects of the present disclosure relate to detecting common vulnerabilities and exposures (CVE), and more particularly, to techniques for providing a CVE detection service while maintaining client privacy.

BACKGROUND

Common Vulnerabilities and Exposures (CVE) refers to a list of known computer security flaws. Such vulnerabilities may apply to various types of software, including proprietary and open source software. When a security flaw is discovered, for example, by a vendor or researcher, it can be reported to a CVE numbering authority, which assigns a CVE ID and eventually reports the security flaw to the public. CVEs can help information technology (IT) professionals to address these vulnerabilities to make computer systems more secure. A company writing software will want to keep abreast of the latest CVEs in order to take prompt action to mitigate vulnerabilities.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 5 is a process flow diagram summarizing a method 500 for processing a scan request, in accordance with embodiments of the present disclosure.

DETAILED DESCRIPTION

Figure 1:
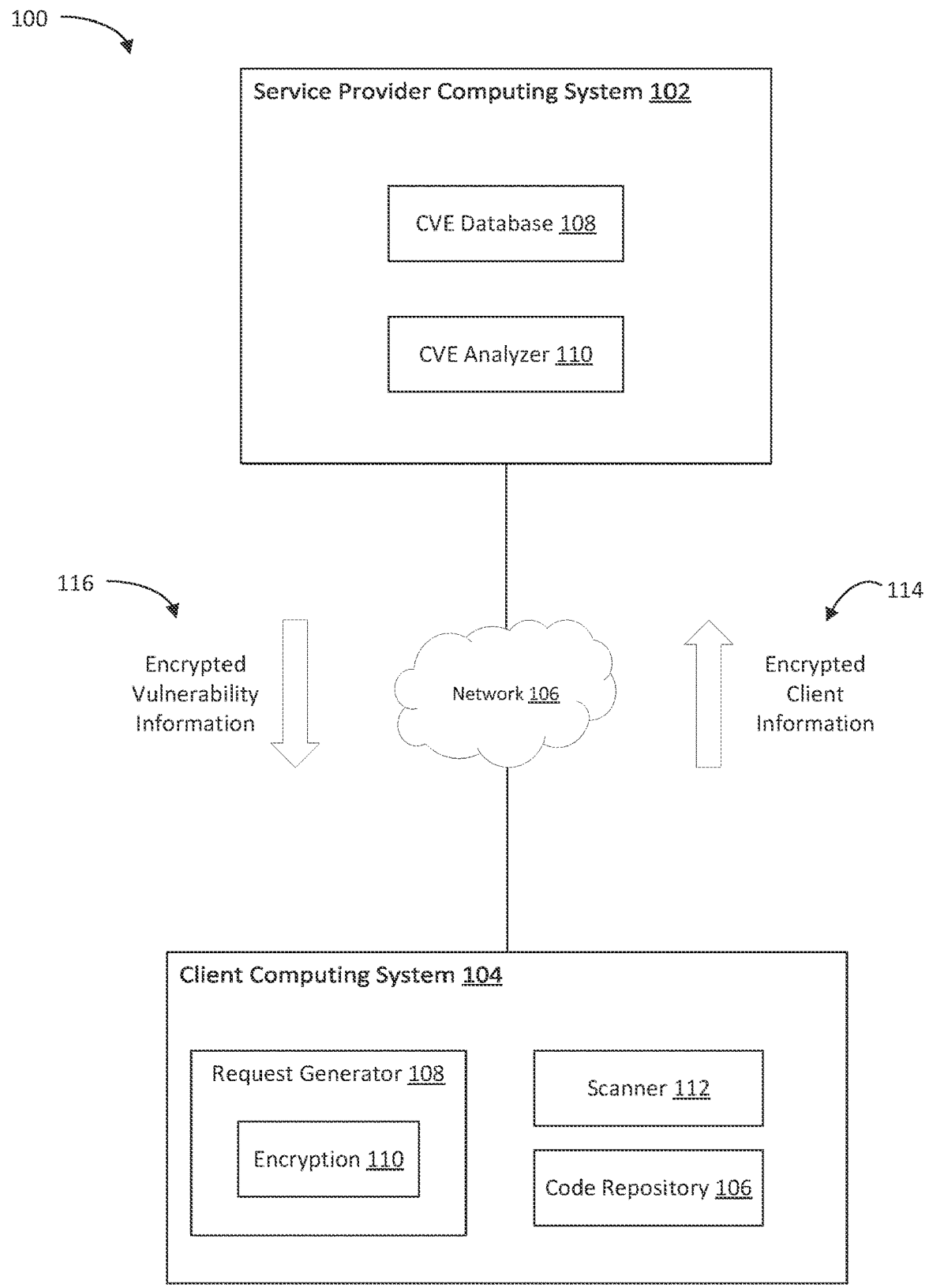
FIG. 1 is a block diagram of an example computing network, in accordance with embodiments of the present disclosure.

A company writing software will want to keep abreast of the latest CVEs in order to take prompt action to mitigate known vulnerabilities. Software developers may use a large number of software files and packages, all of which could potentially be the subject of a vulnerability. Keeping track of all of the possible vulnerabilities affecting all of the various software packages may be a very arduous undertaking. Accordingly, a software developer may prefer to make use of a service that is able to evaluate the developer's suite of software development tools and advise the software developer about applicable vulnerabilities.

Often such a service provider will have the latest database of CVEs on their network. To make use of such a service, the software developer or other customer, referred to herein as the client, would have to identify all of the various software packages and images that the client uses and provide this information to the service provider so that it can be compared to the service provider's CVE database. However, this information could in itself be quite sensitive. If a malicious actor was able to somehow intercept or otherwise obtain this information, the malicious actor would be able to determine which vulnerabilities the client is more susceptible to. Accordingly, providing this information, even to a legitimate service provider, presents a risk that the information could be used to open the client to potential attack vectors.

Embodiments of the present techniques allow a service provider to detect the latest CVEs applicable to a suite of software tools in use by a client without exposing any of the client's data about the same. In accordance with the present techniques, the client can send a scan request to the service provider. The scan request can include all of the relevant client information, such as the software packages and versions in use, but in encrypted form so that the client does not expose that information outside of the company. The client information may be encrypted using homomorphic encryption, which is a type of encryption in which computations can be performed on the encrypted data without first decrypting it. The resulting computations are in an encrypted form which, when decrypted, produces the same output that would have been produced if the operations had been performed on the unencrypted data.

Upon receiving the scan request, the service provider can use a CVE analyzer that scans the encrypted information for vulnerabilities without ever decrypting the data. The CVE analyzer can identify any known vulnerabilities, and the service provider and can return the scan results back to the user. Due to the nature of how the CVE analyzer operates, the scan results that are returned to the client are also encrypted. The client is able to decrypt the scan results to determine possible vulnerabilities and, in some embodiments, potential remedies to the vulnerabilities.

In some embodiments, the service provider can also provide a manifest scanner to the client. The manifest scanner is a program that can be loaded on the client's system and used to automatically scan the client's software codebases to produce a manifest that includes all of the relevant client information such as the software packages and versions in use. The manifest can generate a file that represents this information in a standardized format that can be consumed by a homomorphic encryption program residing on the clients computing system. The use of the manifest scanner reduces the workload of the client by eliminating the need for the client to continuously compile lists of software packages and versions in use. Additionally, the scanner provides the advantage that the customer does not need to know what to look for in the codebase or how to format the acquired information. It also improves the accuracy of the scan by reducing the possibility of human error in gathering the information and properly formatting the information.

Embodiments of the present techniques provide a CVE detection service that is user friendly and easily accessible without the client having to expose sensitive information to outside entities, such as the software packages and versions in use. Such a system can ease customer anxiety about using such a service, which can lead to improved vulnerability tracking and remediation.

FIG. 1 is a block diagram of an example computing network in accordance with embodiments of the present disclosure. The computing network 100 includes a service provider computing system 102 and a client computing system 104 communicatively coupled through a network 106.

The service provider computing system 102 is configured to analyze the codebase of client systems, such as the client computing system 104, to identify vulnerabilities. As used here, a vulnerability refers to any security flaw present in a piece of software. Such vulnerabilities may be publicly known and may be recorded in a CVE list maintained by a CVE numbering authority. However, embodiments of the present techniques may apply to any type of vulnerability, whether it is publicly known or maintained as proprietary information.

The service provider computing system 102 may include hardware such as processing devices, volatile memory, persistent data storage devices, networking equipment, and other hardware devices. The service provider computing system 102 may be may a distributed set of devices, including any suitable type of computing devices or machines that have a programmable processing resources including, for example, server computers, desktop computers, laptop computers, tablet computers, etc. The service provider computing system 102 may comprise a single machine or may include multiple interconnected machines (e.g., multiple servers configured in a cluster). For example, the service provider computing system 102 may be implemented in a cloud computing system.

The service provider computing system 102 may include, or have access to, a CVE database 108 and a CVE analyzer 110. The CVE database 108 may include a list of vulnerabilities, some or all of which may be publicly known. In some embodiments, the CVE database is maintained by the service provider or a third party such as a CVE numbering authority. The vulnerabilities may be any type of security fault, such as a flaw in software package, application, driver, Application Specific Interface (API), source code, executable image, or other software component, that could potentially leave a system open to attack.

The service provider computing system 102 also includes a CVE analyzer 110, which is a program that is configured to search the client information for vulnerabilities. The CVE analyzer 110 may be generated, at least in part, using vulnerability information from the CVE database 108, and may be periodically updated to account for changes to the CVE database 108. In some embodiments, the CVE analyzer 110 is an encrypted executable program, which is encrypted using fully homomorphic encryption. Techniques for generating the CVE analyzer 110 are described further in relation to FIG. 2.

The client computing system 104 may include hardware such as processing devices, volatile memory, persistent data storage devices, networking equipment, and other hardware devices. The service provider computing system 104 may be may a distributed set of devices, including any suitable type of computing devices or machines that have a programmable processing resources including, for example, server computers, desktop computers, laptop computers, tablet computers, etc. The service provider computing system 104 may comprise a single machine or may include multiple interconnected machines (e.g., multiple servers configured in a cluster). For example, the service provider computing system 104 may be implemented in a cloud computing system.

In some embodiments, the client computing system 104 is used, at least in part, to generate software. Accordingly, the client computing system 104 may include, or have access to, a code repository. The code repository 106 includes a collection of software packages, code modules, software images, and any other software tools, files, or programs in use by the client or generated by the client. The code repository 106 may be a storage system included in the client computing system 104 and accessible, for example, through an enterprise network maintained by the client. Additionally, the code repository 106 may be maintained by a third party service, such as a Github master branch, for example. In some examples, the code repository 106 may be distributed over several computing devices, storage devices, servers, etc.

The client computing system 104 can send a scan request to the service provider computing system 102 to request a scan for vulnerabilities. The scan request may be generated by a request generator, which can package all of the necessary client information. The client information may describe any information about the various forms of software or other programming code being used by the client, such software packages in use by the client and additional information about those client packages such as version information. The client information may also describe any code modules, drivers, software, or firmware being used by the client. In some examples, the client information may be generated by a scanner 112, which scans the files in the code repository to gather the client information.

Once the client information has been obtained, the request generator 108 can encrypt the client information before sending the scan request with the encrypted client information 114 to the service provider computing system 102. Upon receipt of the scan request, the CVE analyzer 110 can scan the encrypted client information 114 to identify vulnerabilities. The CVE analyzer 110 is able to analyze the encrypted client information 114 without ever decrypting the client information back to plain text. The techniques for scanning the encrypted client information 114 are described further in relation to FIG. 2.

When the scan is complete, the service provider computing system 102 can return a scan report to the client computing system 104, which includes encrypted vulnerability information 116 detailing the vulnerabilities detected and possible remediations. Each vulnerability may describe the software package or other item of code effected and any other information that may be known about the vulnerability. Additionally, the report may describe a remediation for some or all of the reported vulnerabilities. For example, the report may indicate that a particular vulnerability may be remediated by upgrading the affected software to a newer version. The scan report is encrypted and cannot be read by the service provider computing system 102 but can be decrypted by the client computing system 104.

It will be appreciated that various alterations may be made to the system illustrated in FIG. 1 and that some components may be omitted or added without departing from the scope of the disclosure.

Figure 2:
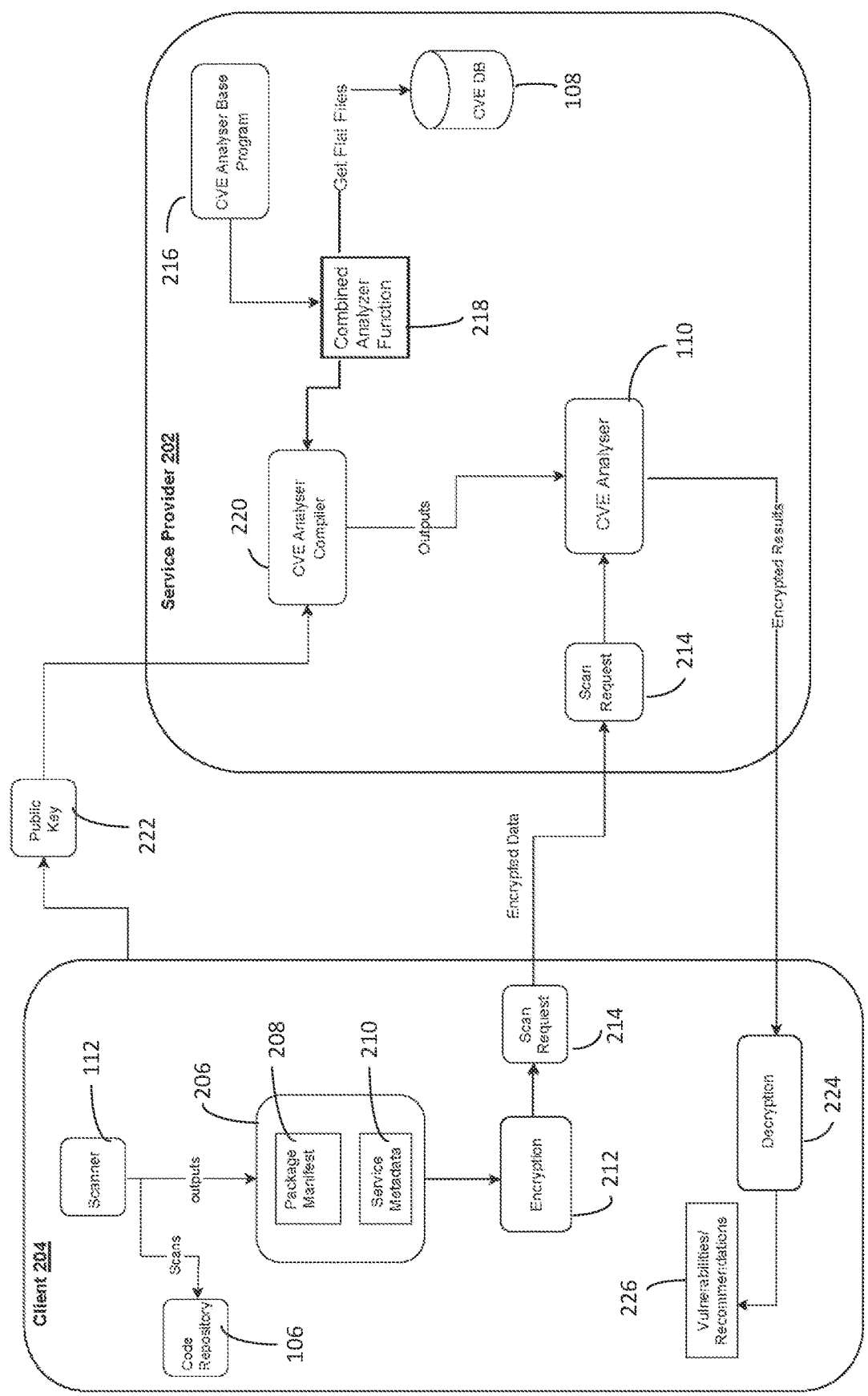
FIG. 2 illustrates an example process for scanning a client's codebase to identify vulnerabilities, in accordance with embodiments of the present disclosure.

FIG. 2 illustrates an example process for scanning a client's codebase to identify vulnerabilities, in accordance with embodiments of the present disclosure. The process described in relation to FIG. 2 is performed between a service provider 202 and a client 204 of the service provider. In reference to FIG. 1, the service provider 202 may refer to the service provider computing system 102, and the client 204 may refer to the client computing system 104.

The process may be initiated by the client 204 requesting a scan of the client's codebase. This may be performed at regular intervals, in response to changes in the codebase, or at the request of a system administrator, for example. Once the scanning process is initiated, the scanner 112 performs a scan of the client's code repository 106 to identify and analyze the source code and/or program images in use by the client 204. The output of the scanning process is the client information 206, which may include a package manifest 208 and service metadata 210. The package manifest 208 describes all of the software packages, code modules, etc., being used by the client and corresponding version data. The service metadata 210 includes information about the programming platforms or languages being used and corresponding versions.

The scanner 112 may be a program generated by the service provider 202 and provided to the client 204. The client information can be formatted in a manner that is dictated by the programming of the scanner 112 and is specified so as to be compatible with the CVE analyzer 110 used by the service provider 202. The scanner 112 may also provide the client information to an encryption module 212.

The encryption module 212 can encrypt the client information 206 using, for example, homomorphic encryption, which may be a partially or fully homomorphic encryption scheme. One example of a fully homomorphic encryption scheme that may be used in accordance with embodiments is referred to as CKKS (Cheon, Kim, Kim and Song). There are several additional homomorphic encryption schemes and algorithms that can be used in embodiments of the present techniques.

The encryption may be performed using a public key 222 generated by the client 204 as one of a pair of encryption keys that includes the public key 222 and a corresponding private key. Data may be encrypted using public key 222, but data encrypted by the public key can only be decrypted using the private key. Next, the encrypted client information is included in a scan request 214, which is sent to the service provider 202. In addition to the scan request 214, the client 204 also sends to the service provider 202 the public key 222 that was used to encrypt the client information 206.

The service provider 202 includes a CVE analyzer base program 216, which is a non-encrypted, i.e., plaintext, computer program. The CVE analyzer base program 216 may be configured as a lookup program that is able to use certain software-related information as an input to a table of vulnerabilities. The vulnerabilities information may be stored to the CVE database 108 as flat files.

During execution of the CVE analyzer 110, the CVE analyzer 110 will operate as a function known as a "pure function". Among other things, this means that the CVE analyzer 110 will not make calls to external subroutines or receive external information outside of the function. To enable the CVE analyzer 110 to operate as a pure function, the vulnerability information is incorporated into the executable file. Thus, the CVE analyzer base program 216 and the vulnerability information described in the CVE database 108 can be combined at to produce a pure function referred to herein as the combined analyzer function 218. To ensure that the CVE analyzer 110 includes current, up-to-date vulnerability information the combined analyzer function 218 can be updated periodically or as new vulnerability information becomes available by recombining the CVE analyzer base program 216 with current vulnerability information from the CVE database 108.

In response to a scan request received from the client 204, the combined analyzer function 218 is provided to a CVE analyzer compiler 220, which compiles the final CVE analyzer by encrypting the combined analyzer function 218. The encryption technique used for the CVE analyzer 110 may be the same fully homomorphic encryption technique used to encrypt the client information 206, and uses the same public key 222 provided by the client 204. The output of the CVE analyzer compiler 220 is the CVE analyzer 110, which is also shown in FIG. 1. The use of Fully Homomorphic Encryption (FHE) allows computations to be performed on encrypted data without having to decrypt the data first.

Once compiled, the CVE analyzer 110 executes and processes the scan request 214, which includes the client information. The CVE analyzer 110 operates to match the client information (code modules, source code, software images, software packages, software languages, and their versions) with vulnerabilities. In some embodiments, the CVE analyzer base program 216 is configured to allow for parallelism on execution to improve the processing speed.

The scan results identify matches between the client information and the vulnerabilities and can also optionally include recommended remedies for some or all of the matches. The scan results remain encrypted and are returned in encrypted form to the client 204. The client information is never decrypted by the service provider 202 to expose the packages, images, or software being used by the client 204. On the client side, the encrypted results are decrypted by the decryption module 224 using the private key that corresponds with the public key 222 and is preferably known only to the client 204. Once the results are decrypted, the client 204 has access to known vulnerabilities 226 applicable to the software currently in use and, in some cases, may also have recommended remedies that the client 204 can implement locally. For example, a particular match may identify a vulnerability that applies to a particular code module in use by the client and a possible remedy such as updating to a newer version of the code module.

It will be appreciated that various alterations may be made to the process illustrated in FIG. 2 and that some components and processes may be omitted or added without departing from the scope of the disclosure.

Figure 3:
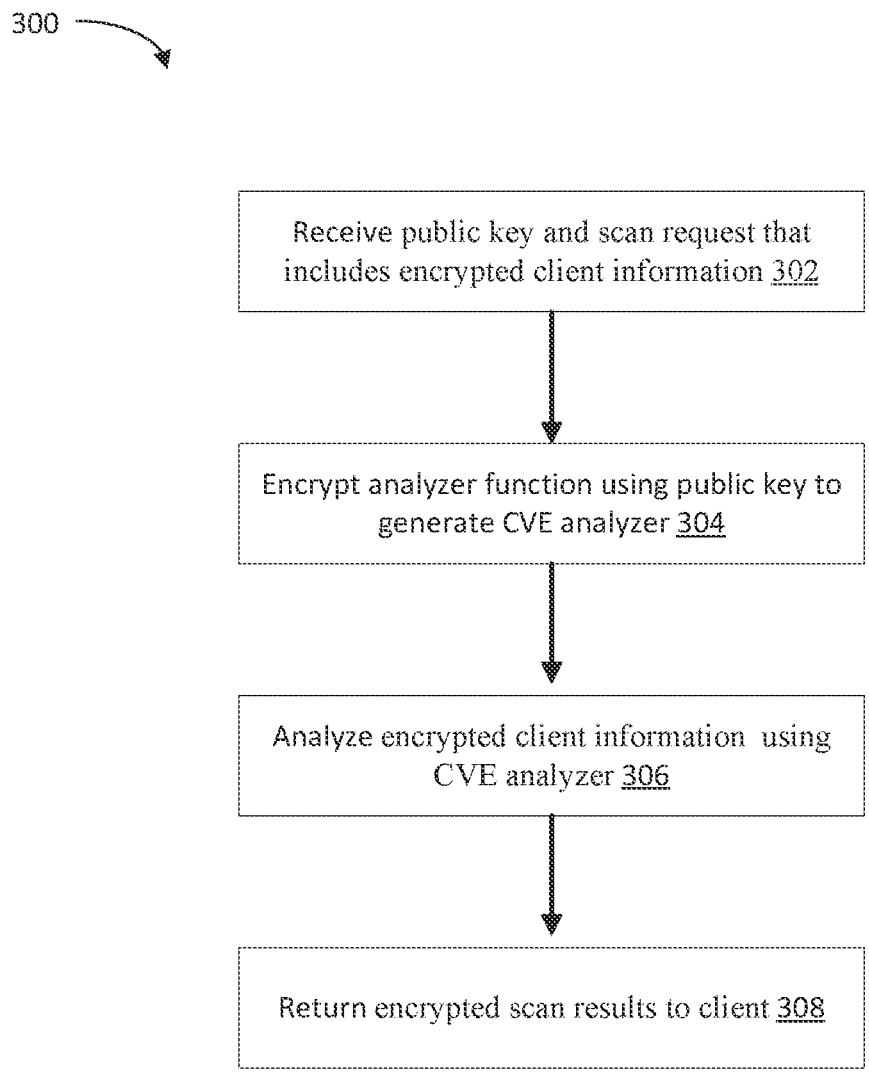
FIG. 3 is a process flow diagram summarizing a method 300 for identifying vulnerabilities in a client system, in accordance with embodiments of the present disclosure.

FIG. 3 is a process flow diagram summarizing a method 300 for identifying vulnerabilities in a client system, in accordance with embodiments of the present disclosure. Method 300 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 300 may be performed by a computing system such as the service provider computing system 102 illustrated in FIG. 1. Prior to the start of the method 300, the computing system may already include a non-encrypted analyzer function. The method may begin at block 302.

At block 302, a scan request is received from the client. The scan request includes encrypted client information and a public encryption key.

At block 304, the analyzer function is encrypted using the public key provided by the client. The encryption applied at block 304 may be any variety of homomorphic encryption, including fully homomorphic encryption schemes such as CKKS.

At block 306, the CVE analyzer is executed to analyze the encrypted client information. The CVE analyzer and the client information are both in an encrypted state when the CVE analyzer is executed, and the analysis generates encrypted scan results.

At block 308, the encrypted scan results are sent to the client. The encrypted scan results can be decrypted by the client using the private encryption key to obtain the identified vulnerabilities and possible remedies.

It will be appreciated that embodiments of the method 300 may include additional blocks not shown in FIG. 3 and that some of the blocks shown in FIG. 3 may be omitted. Additionally, the processes associated with blocks 302 through 308 may be performed in a different order than what is shown in FIG. 3.

Figure 4:
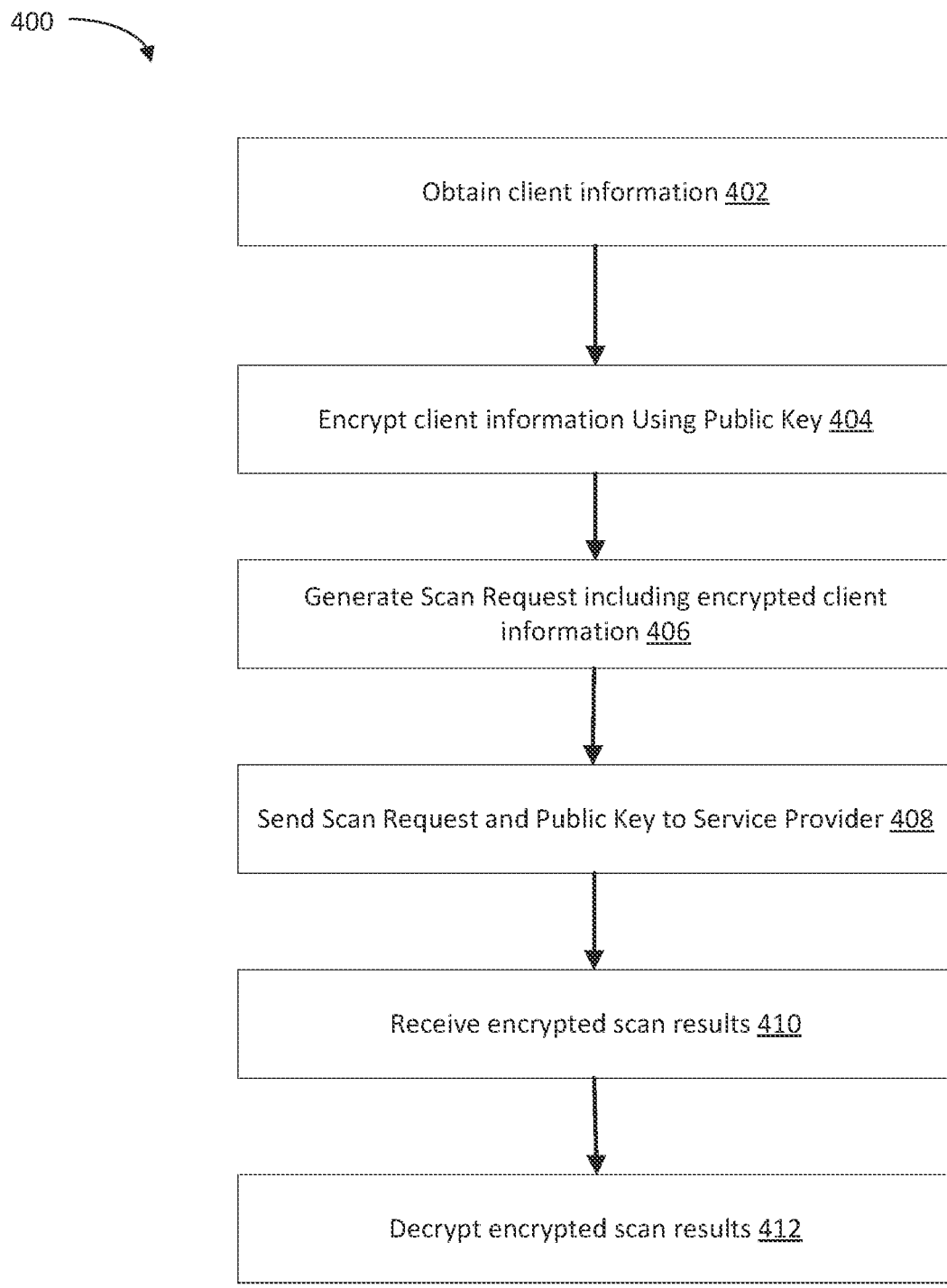
FIG. 4 is a process flow diagram summarizing a method 400 for processing a scan request, in accordance with embodiments of the present disclosure.

FIG. 4 is a process flow diagram of a method 400 for processing a scan request, in accordance with embodiments of the present disclosure. Method 400 may be performed by processing logic that may include hardware, software, firmware, or a combination thereof. In some embodiments, the method 400 may be performed by programming (e.g., scanner 112) provided by the service provider 202 and executing on a client computing system such as the client computing system 104 illustrated in FIG. 1. The method may begin at block 402.

At block 402, client information is obtained. The client information may be obtained by scanning a code repository identified by the client, such as a Github master branch, a physical database, and others, including combinations thereof. The client information identifies any relevant information that can be obtained from the code repository, such as software packages in use, code modules in use, version information, etc.

At block 404, the client information is encrypted using a public key and a homomorphic encryption scheme. The corresponding private key is kept private by the client and may be stored on the client system.

At block 406, the encrypted client information is packaged within a scan request that is sent to the service provider. Additionally, the public key that was used to encrypt the client information is also sent to the service provider.

At block 408, encrypted scan results are received from the service provider.

At block 410, the encrypted scan results are decrypted using the private key kept by the client to obtain the identified vulnerabilities and possible remedies.

It will be appreciated that embodiments of the method 400 may include additional blocks not shown in FIG. 4 and that some of the blocks shown in FIG. 4 may be omitted. Additionally, the processes associated with blocks 402 through 412 may be performed in a different order than what is shown in FIG. 4.

FIG. 5 is a process flow diagram summarizing a method 500 for processing a scan request, in accordance with embodiments of the present disclosure. Method 500 may be performed by processing logic that may include hardware, software, firmware, or a combination thereof and may begin at block 502.

At block 502, a scan request is received from a client computing device. The scan request may be a request to scan a set of encrypted client information to identify vulnerabilities applicable to the client information. At block 504, a processing device, responsive to the scan request, analyzes the encrypted client information to generate scan results that identify vulnerabilities applicable to the client information. The analyzing is performed without decrypting the client information. At block 506, encrypted scan results are sent to the client. The scan results are in encrypted form when the scan results are generated.

It will be appreciated that embodiments of the method 500 may include additional blocks not shown in FIG. 5 and that some of the blocks shown in FIG. 5 may be omitted. Additionally, the processes associated with blocks 502 through 506 may be performed in a different order than what is shown in FIG. 5.

Figure 6:
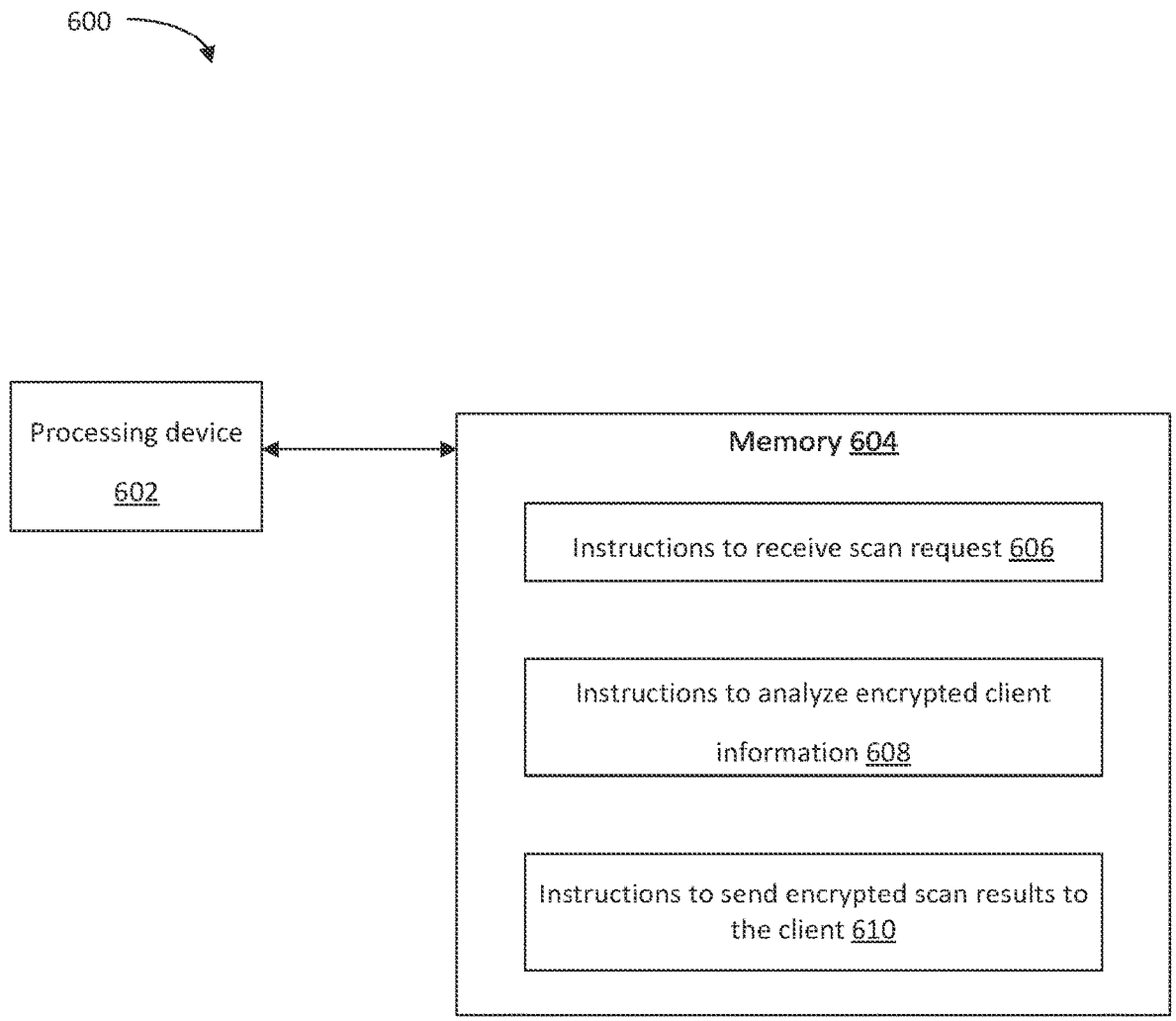
FIG. 6 is a block diagram of a system for processing a scan request, in accordance with embodiments of the present disclosure.

FIG. 6 is a block diagram of a system for processing a scan request, in accordance with embodiments of the present disclosure. The system 600 includes a processing device 602 operatively coupled to a memory 604. The memory 604 includes instructions that are executable by the processing device 602 to cause the processing device 602 to process a scan request.

The memory 604 includes instructions to receive a scan request 606. The scan request can be received from a client computing device and is a request to scan a set of encrypted client information to identify vulnerabilities applicable to the client information. The memory 604 includes instructions to analyze encrypted client information 608. Analyzing the encrypted client information is performed to generate scan results that identify vulnerabilities applicable to the client information without decrypting the client information. The memory 604 also includes instructions to send encrypted scan results to the client 610. The scan results are in encrypted form when the scan results are generated by the processing device.

It will be appreciated that various alterations may be made to the process illustrated in FIG. 6 and that some components and processes may be omitted or added without departing from the scope of the disclosure.

Figure 7:
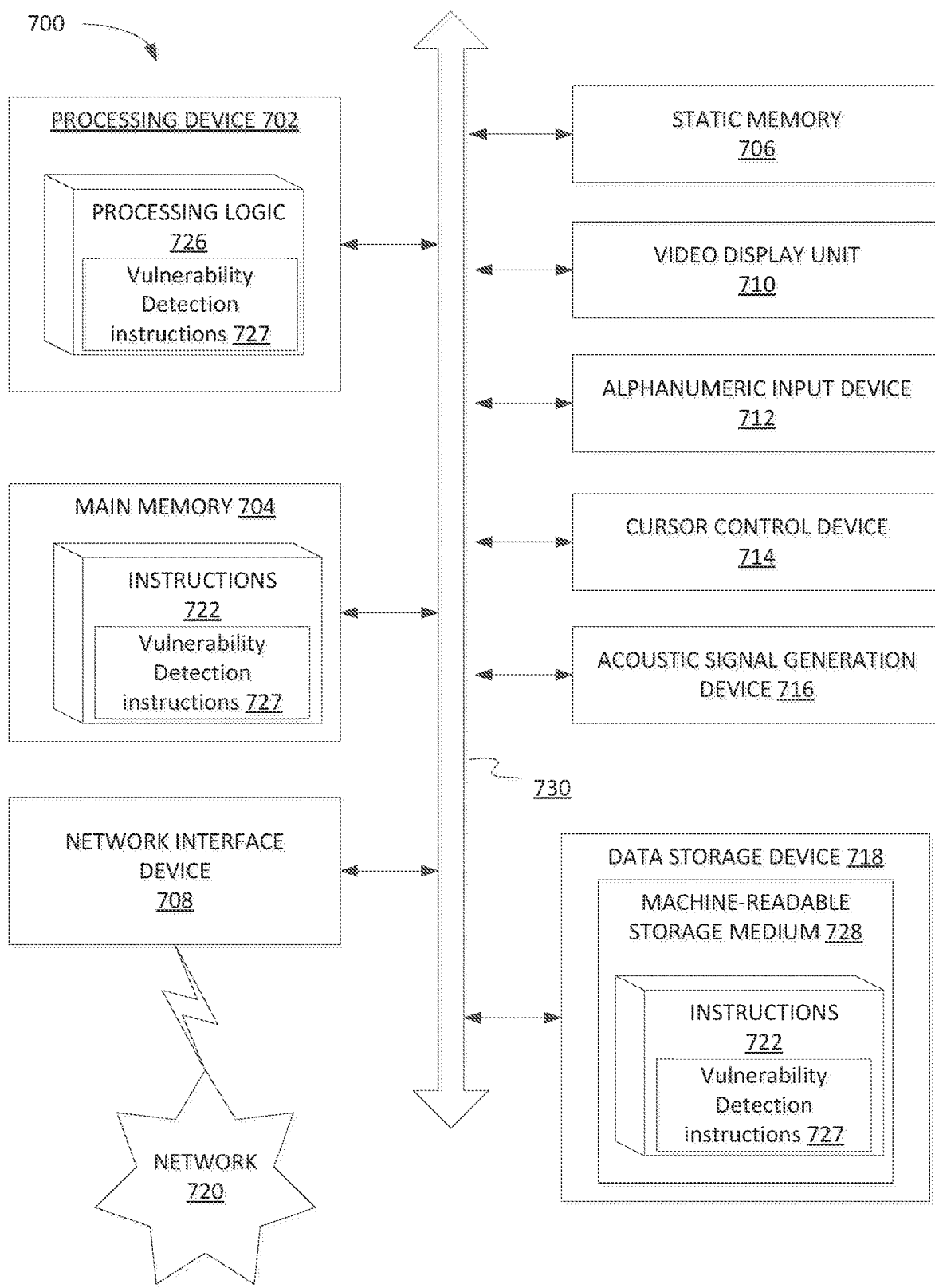
FIG. 7 is a block diagram of an example computing device that may perform one or more of the operations described herein, in accordance with some embodiments of the present disclosure.

FIG. 7 illustrates a diagrammatic representation of a machine in the example form of a computer system 700 within which a set of instructions, for causing the machine to perform any one or more of the methodologies discussed herein for performing a scan of a client's information to identify vulnerabilities. The machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute vulnerability detection instructions 727, for performing the operations and processes discussed herein.

The data storage device 718 may include a machine-readable storage medium 728, on which is stored one or more sets of vulnerability detection instructions 727 (e.g., software) embodying any one or more of the methodologies of functions described herein. The vulnerability detection instructions 727 may also reside, completely or at least partially, within the main memory 704 or within the processing device 702 during execution thereof by the computer system 700; the main memory 704 and the processing device 702 also constituting machine-readable storage media. The vulnerability detection instructions 727 may further be transmitted or received over a network 720 via the network interface device 708.

While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   receiving, from a client computing device, a scan request to identify vulnerable client information;
   sending a scanner to the client computing device, wherein the scanner is to scan a code repository of the client and, based on the scan, generate client information comprising names and versions of software packages in use by the client, wherein the scanner is further to cause the client information to be encrypted using fully homomorphic encryption to generate encrypted client information;
   responsive to the scan request, analyzing, by a processing device, the encrypted client information to generate scan results that identify vulnerabilities applicable to the client information, wherein the analyzing is performed without decrypting the encrypted client information; and
   sending the scan results to the client computing device, wherein the scan results are in encrypted form when the scan results are generated.

2. The method of claim 1, comprising generating an analyzer base program to compare the encrypted client information with known vulnerabilities.

3. The method of claim 2, comprising retrieving the known vulnerabilities from a common vulnerabilities and exposures (CVE) database and combining the known vulnerabilities with the analyzer base program to generate an analyzer function.

4. The method of claim 3, comprising, responsive to the scan request, encrypting the analyzer function using a public key received from the client computing device to generate an analyzer, wherein the analyzing is performed by the analyzer.

5. The method of claim 4, wherein encrypting the analyzer function is performed using fully homomorphic encryption (FHE).

6. A system comprising:
   a memory; and
   a processing device operatively coupled to the memory, the processing device to:
      receive, from a client computing device, a scan request to identify vulnerable client information;
      send a scanner to the client computing device, wherein the scanner is to scan a code repository of the client computing device and, based on the scan, generate client information comprising names and versions of software packages in use by the client computing device, wherein the scanner is further to cause the client information to be encrypted using homomorphic encryption to generate encrypted client information;
      responsive to the scan request, analyze the encrypted client information without decrypting the encrypted client information to generate scan results that identify vulnerabilities applicable to the client information; and
      send the scan results to the client computing device, wherein the scan results are in encrypted form when the scan results are generated by the processing device.

7. The system of claim 6, wherein the memory stores an analyzer base program to perform lookups to compare the client information with known vulnerabilities.

8. The system of claim 7, wherein the processing device is further to retrieve the known vulnerabilities from a common vulnerabilities and exposures (CVE) database and combine the known vulnerabilities with the analyzer base program to generate an analyzer function.

9. The system of claim 8, wherein the processing device is further to, responsive to the scan request, encrypt the analyzer function using a public key received from the client computing device to generate an analyzer used by the processing device to analyze the encrypted client information.

10. The system of claim 9, wherein the analyzer function is encrypted using fully homomorphic encryption (FHE).

11. A non-transitory computer readable medium, having instructions stored thereon that, when executed by a processing device, cause the processing device to:
    receive, from a client computing device, a scan request to identify vulnerable client information;
    send a scanner to the client computing device, wherein the scanner is to scan a code repository of the client computing device and, based on the scan, generate client information comprising names and versions of software packages in use by the client computing device, wherein the scanner is further to cause the client information to be encrypted using homomorphic encryption to generate encrypted client information;
    responsive to the scan request, analyze the encrypted client information without decrypting the encrypted client information to generate scan results that identify vulnerabilities applicable to the client information; and
    send the scan results to the client computing device, wherein the scan results are in encrypted form when the scan results are generated.

12. The non-transitory computer readable medium of claim 11, wherein the instructions further cause the processing device to retrieve known vulnerabilities from a common vulnerabilities and exposures (CVE) database and combine the known vulnerabilities with an analyzer base program to generate an analyzer function.

13. The non-transitory computer readable medium of claim 12, wherein the instructions further cause the processing device to, responsive to the scan request, encrypt the analyzer function using a public key received from the client computing device to generate an analyzer used by the processing device to analyze the encrypted client information.

14. The non-transitory computer readable medium of claim 13, wherein the instructions cause the processing device to encrypt the analyzer function using fully homomorphic encryption (FHE).

\* \* \* \* \*